UNITED STATES PATENT OFFICE.

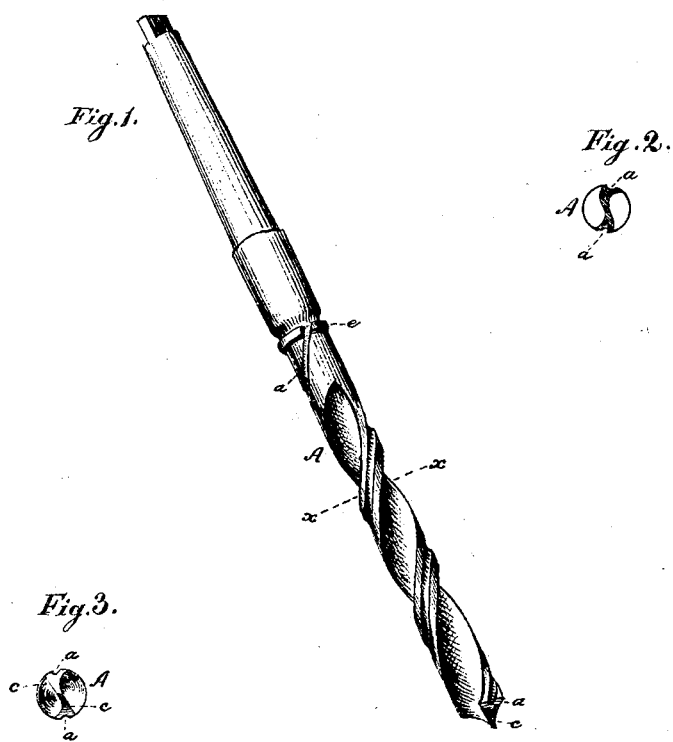

THEODORE V. BOYDEN, OF BRIDGEPORT, CONNECTICUT.

IMPROVEMENT IN DRILLS.

Specification forming part of Letters Patent No. 112,115, dated February 28, 1871.

*To all whom it may concern:*

Be it known that I, THEODORE V. BOYDEN, of Bridgeport, in the county of Fairfield and State of Connecticut, have invented certain new and useful Improvements in Drills; and I do hereby declare that the following is a full, clear, and exact description thereof, reference being had to the accompanying drawing, making part of this specification, and to the letters of reference marked thereon, like letters indicating like parts wherever they occur.

To enable others skilled in the art to construct and use my invention, I will proceed to describe it.

My invention relates to drills for drilling or boring holes in metals; and the invention consists in providing means for conveying oil or other lubricant to the cutting point or lips of the drill, as hereinafter more fully explained.

Figure 1 is a perspective view of a twist-drill having my improvement applied thereto. Fig. 2 is a cross-section of the same on the line $x\ x$ of Fig. 1; and Fig. 3 is an end view of the lips or cutting-point.

In drilling and cutting metals it is necessary to use a lubricant of some kind to reduce or prevent friction of the drill in or on the metal. Heretofore the only method of doing this has been to apply it upon the surface of the drill, or in the groove formed by the twist of the drill if a twist-drill were used. When thus applied the oil was brought into direct contact with the chips or borings, to which it adhered more or less, thus necessitating the use of an excessive quantity, creating waste, and, besides, it is prevented, to a great extent, from reaching the cutting-lips—the point where it is more especially required.

My present invention has for its object the remedying of these difficulties by so constructing the drill as to provide a channel for the special purpose of conveying the oil or lubricant to the cutting lips or point of the drill without contact with the chips.

To do this I make a small groove, $a$, in the outer edge or periphery of drill, said groove extending from the shank of the drill all the way to its point, and terminating in the cutting-lips $c$, as represented in Figs. 1 and 3.

Around the shank, above where the twist begins, there is formed a ledge or flange, $e$, above which there is a recess, into which the oil is fed or placed; and the upper end of the grooves $a$ pass through the ledge or flange $e$ into the recess or oil-chamber above it, so that the oil or lubricant supplied to the drill above this ledge or flange $e$ will be directed into the upper end of the grooves $a$, and flow thence along down to the point or lips of the drill.

The ledge or flange $e$ should be so formed that its outer edge shall be turned up more or less to form a sort of trough to hold the oil and prevent it from escaping except in the grooves $a$. This may be readily done by turning the recess above the ledge $e$ in the required form; or, if preferred, a cup-shaped flange may be soldered or screwed onto the drill at this point instead, thus forming a cup or reservoir to receive or contain the lubricant and feed it gradually into the grooves $a$.

The oil may be applied by hand, a little at a time; or, if the drill be used in a machine, the oil or lubricant may be fed to it by a small tube arranged to deliver it to the cup or recess above the flange $e$.

When thus constructed and used, it will be seen that the lubricant will flow down the grooves $a$, and be delivered at the point directly to the cutting-lips of the drill. At the same time it will keep the periphery or edges of the body of the drill lubricated more or less, and thus prevent it from sticking or binding in the hole; and this is the more important in that class of drills now used in which the body is made of a uniform diameter, or very nearly so, throughout its length. By this means the oil is kept from being wasted by contact with the chips or borings, and they, not being clogged or rendered adhesive by the oil, are lifted from the hole far more readily, thus enabling the drill to clear itself, and avoiding the necessity of removing it from the hole, either to clear it of chips or to apply the lubricant to the lips or point.

It is obvious that this improvement may be applied to other kinds besides twist-drills, but it is specially applicable to them.

Having thus described my invention, what I claim is—

1. One or more grooves or channels, *a*, formed in or along the outer edge or periphery of a drill, substantially as and for the purpose set forth.

2. In combination with one or more grooves, *a*, a reservoir or recess for receiving and feeding the oil to the grooves in a drill, substantially as herein described.

THEODORE V. BOYDEN.

Witnesses:
HENRY C. RYLANDS,
A. J. HOBBS.